United States Patent
Seitz et al.

(10) Patent No.: US 11,270,472 B2
(45) Date of Patent: Mar. 8, 2022

(54) SMALL VECTOR IMAGE GENERATION

(71) Applicant: Hewlett-Packard Development Company, L.P., Spring, TX (US)

(72) Inventors: Andreas Karl Seitz, San Diego, CA (US); Arjun Angur Patel, San Diego, CA (US); Alexis Katherine Gregorich, San Diego, CA (US); Alejandro Mendez, San Diego, CA (US); Christine Murray Harris, San Diego, CA (US); Lyndsay Toll, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/620,996

(22) PCT Filed: Jun. 16, 2017

(86) PCT No.: PCT/US2017/037942
§ 371 (c)(1),
(2) Date: Dec. 10, 2019

(87) PCT Pub. No.: WO2018/231251
PCT Pub. Date: Dec. 20, 2018

(65) Prior Publication Data
US 2020/0098142 A1  Mar. 26, 2020

(51) Int. Cl.
*G06T 11/00* (2006.01)
*G06T 7/00* (2017.01)

(52) U.S. Cl.
CPC ............... *G06T 11/00* (2013.01); *G06T 7/97* (2017.01); *G06T 2207/10024* (2013.01); *G06T 2210/56* (2013.01)

(58) Field of Classification Search
None
See application file for complete search history.

(56) References Cited

U.S. PATENT DOCUMENTS

| 5,280,367 A | 1/1994 | Zuniga |
| 6,044,172 A * | 3/2000 | Allen ............. H04N 1/646 358/523 |
| 2006/0101005 A1* | 5/2006 | Yang ............. G06F 16/9537 |

(Continued)

FOREIGN PATENT DOCUMENTS

| JP | 2005352777 | 12/2005 |
| JP | 2006279545 | 10/2006 |

(Continued)

OTHER PUBLICATIONS

Alexandra Bonnici et al: "A circle-based vectorization al gorithm for drawings with shadows", Proceedings ~ SBIM '13, Jan. 1, 2013, p. 69.

(Continued)

*Primary Examiner* — Andrae S Allison
(74) *Attorney, Agent, or Firm* — Brooks Cameron & Huebsch PLLP

(57) ABSTRACT

In some examples, a computing device can define a marked area of an image of analog imagery captured by the computing device, separate the analog imagery of the image from a background of the image, and generate a small vector image that includes the analog imagery of the image.

14 Claims, 5 Drawing Sheets

(56) References Cited

U.S. PATENT DOCUMENTS

| | | | |
|---|---|---|---|
| 2008/0059889 A1* | 3/2008 | Parker | G06F 16/29 715/748 |
| 2009/0262378 A1* | 10/2009 | Jensen | G06T 5/30 358/1.12 |
| 2009/0285487 A1* | 11/2009 | Knoblock | G06K 9/00637 382/190 |
| 2009/0297030 A1* | 12/2009 | Oota | H04N 1/4092 382/190 |
| 2010/0257210 A1 | 10/2010 | Witkin et al. | |
| 2011/0007941 A1* | 1/2011 | Chen | G06T 7/75 382/103 |
| 2011/0119265 A1* | 5/2011 | Shahabi | G06F 16/38 707/729 |
| 2011/0167081 A1* | 7/2011 | Kosaka | G09G 5/00 707/769 |
| 2011/0182508 A1* | 7/2011 | Ives | G06K 9/00449 382/164 |
| 2013/0191861 A1* | 7/2013 | Sasaki | H04N 21/4882 725/32 |
| 2015/0062602 A1* | 3/2015 | Ono | G06K 15/188 358/1.9 |
| 2015/0331888 A1 | 11/2015 | Shomair et al. | |
| 2016/0050169 A1 | 2/2016 | Ben Atar et al. | |

FOREIGN PATENT DOCUMENTS

| | | |
|---|---|---|
| JP | 2009296150 | 12/2009 |
| JP | 2015049257 | 3/2015 |

OTHER PUBLICATIONS

Gioacchino Nori S et al: "Topology-driven vectorization of clean line drawings", ACM Transactions on Graphics, vol. 32, No. 1, Jan. 1, 2013, pp. 1-11.

Jean-Dominique Favreau et al: "Fidelity vs. simplicity", ACM Transactions on Graphics, ACM, NY, US, vol. 35, No. 4, Jul. 11, 2016 (Jul. 11, 2016), pp. 1-18.

RichardT C et al: "Vectorising Bitmaps into Semi-Transparent Gradient Layers", Computer Graphics Forum: Journal of the European Association for Computer Graphics, Wiley-Blackwell, Oxford, vol. 33, No. 4, Jul. 1, 2014.

Imoji For iPhone Lets You Turn Any Image Into A Custom Emoji, Jul. 24, 2014 ~ https://techcrunch.com ~ 9 pages.

Procedure to Design Your Own Graffiti Stickers, 2016 ~ htips://www.slideshare.net/ ~ Jun. 14, 2017 ~ 8 pages.

Slack: Workplace Message App So Cute You Want to Use It at Home, Mar. 26, 2015 ~ http://archive.fo/Fk0UZ ~ 5 pages.

* cited by examiner

SMALL VECTOR IMAGE GENERATION

BACKGROUND

Vector graphics can utilize shapes to represent images in some computer graphics. Vector graphics can be based on vectors, which lead through locations that can be referred to as control points or nodes. Vector graphics can comprise a plurality of paths along an x-axis and a y-axis of an image. The plurality of paths can be assigned various attributes such as stroke, color, shape, curve, thickness, and/or fill.

DETAILED DESCRIPTION

Small vector images (e.g., stickers, digital stickers, etc.) can be vector graphics that can be displayed on a display of a computing device. As used herein, small vector images can comprise a plurality of geometric objects to form analog imagery and/or a background of an image. In some examples, the small vector images can be positioned on other graphical images (e.g., pictures, text, etc.) via the display of the computing device. The small vector images can be stored in a database or by an application of the computing device. For example, a sticker application or signature application can be utilized to store a plurality of small vector images that can be positioned within or on other graphical images or documents displayed on the display of the computing device.

In some examples, the small vector images can be downloaded and/or purchased via the computing device and stored by an application. In some examples, the application can be an image editing application that can be utilized to edit a graphical image. In these examples, the image editing application can include a sticker application that can include a plurality of small vector images that can be added, adjusted, and/or positioned on a selected graphical image.

Small vector image generation as described herein can include generating custom small vector images from images. In some examples, the small vector image generation can include capturing an image from a substrate via a camera. For example, an image of a drawing on a piece of paper can be captured by a camera of a mobile computing device. In this example, the image can be utilized to generate a custom small vector image. In this example, the generated small vector image can be stored by an application with other small vector images downloaded or purchased by a user of the mobile computing device. In this way a mobile computing device can generate custom small vector images that can be stored and/or positioned within or on other graphical images.

Figure 1:
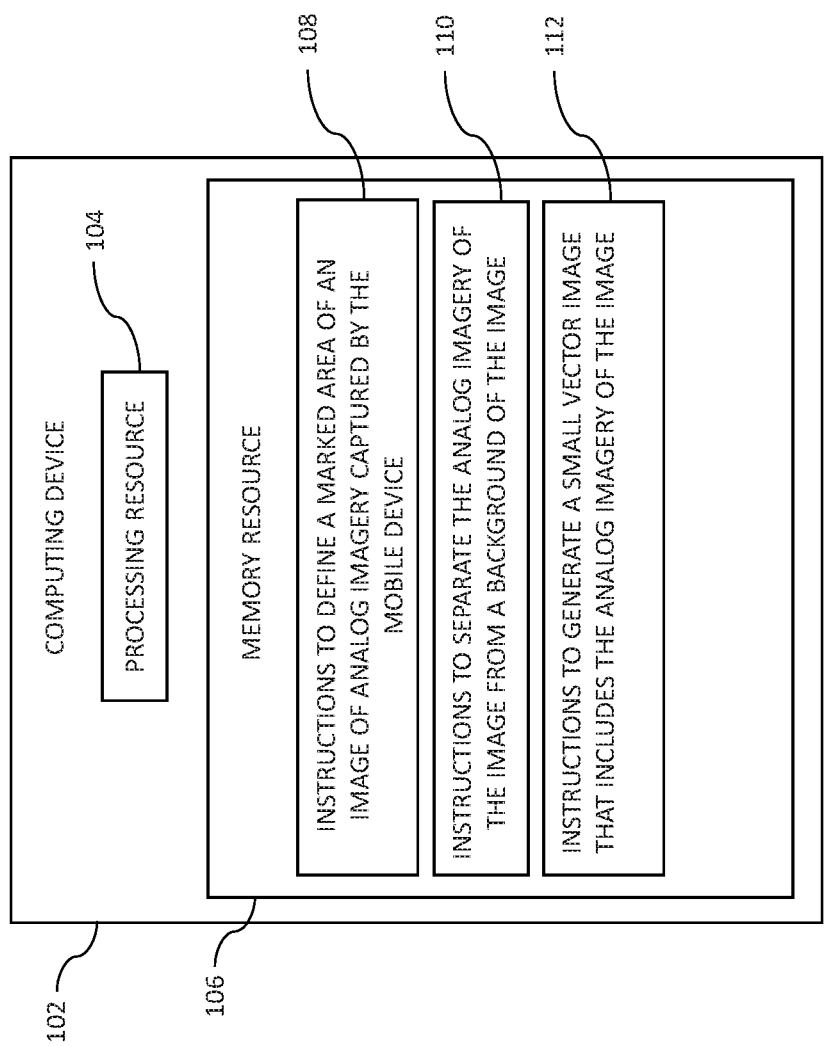
FIG. 1 illustrates a block diagram of an example of a computing device suitable for small vector image generation consistent with the disclosure.

FIG. 1 illustrates a block diagram of an example of a computing device 102 suitable for small vector image generation consistent with the disclosure. In some examples, the computing device 102 can be a mobile computing device or mobile device such as a smart phone or tablet. The computing device 102 can include a processing resource 104 and a memory resource 106 (e.g., machine readable storage medium, non-transitory machine readable storage medium, etc.). Memory resource 106 can include machine readable instructions, including define a marked area instructions 108, separate instructions 110, and/or generate a small vector image instructions 112.

Processing resource 104 may be a central processing unit (CPU), a semiconductor based microprocessor, and/or other hardware devices suitable for retrieval and execution of machine-readable instructions 108, 110, 112 stored in a memory resource 106. Processing resource 104 may fetch, decode, and execute instructions 108, 110, 112. As an alternative or in addition to retrieving and executing instructions 108, 110, 112 processing resource 104 may include a plurality of electronic circuits that include electronic components for performing the functionality of instructions 108, 110, 112.

Memory resource 106 may be any electronic, magnetic, optical, or other physical storage device that stores executable instructions 108, 110, 112 and/or data. Thus, memory resource 106 may be, for example, Random Access Memory (RAM), an Electrically-Erasable Programmable Read-Only Memory (EEPROM), a storage drive, an optical disc, and the like, Memory resource 106 may be disposed within the computing device 102, as shown in FIG. 1. Additionally, and/or alternatively, memory resource 106 may be a portable, external or remote storage medium, for example, that allows the computing device 102 to download the instructions 108, 110, 112 from the portable/external/remote storage medium.

Processing resource 104 may execute define a marked area instructions 108 stored in memory resource 106 to define a marked area (e.g., area with markings, border of the image, etc.) of an image of analog imagery captured by the computing device 102. As used herein, analog imagery can, for example, include images, marks, text, and/or shapes on a substrate. For example, the analog imagery can be a drawing of an image and/or text on a piece of paper. In this example, the analog imagery can be captured by a camera (e.g., digital camera, etc.) coupled to the computing device 102.

In some examples, defining a marked area of the image can include defining an area of the image that includes the analog imagery and surrounding background. For example, defining a marked area can include determining a portion of an image to be utilized for generating a small vector image. In this example, defining the marked area can include selecting an area surrounding the analog imagery captured by the camera.

Processing resource 104 may execute separate instructions 110 stored in memory resource 106 to separate the analog imagery of the image from a background of the image. As described herein, the analog imagery can include images and/or text that is printed or drawn on a substrate such as paper. In some examples, the instructions 110 can separate the analog imagery from the substrate. For example, the analog imagery can be a drawing on a piece of paper. In this example, the instructions 110 can separate the drawing portions of the image from the paper background.

In some examples, the separating the analog imagery of the image from the background of the image can include utilizing a contrast threshold value to distinguish between the analog imagery and the background. In some examples, the contrast threshold value can be utilized by determining that the analog imagery is above a contrast threshold value and the background is below the contrast threshold value when the analog imagery is on a relatively light background compared to the analog imagery. For example, the analog imagery can be markings (e.g., pen markings, pencil markings, paint markings, etc.) drawn on a white paper. In this example, the markings would have a relatively high contrast and the white paper would have a relatively low contrast. In this example, a contrast threshold between the markings and the white paper can be utilized to separate the markings (e.g., analog imagery) from the white paper (e.g., background).

Processing resource 104 may execute generate a small vector image instructions 112 stored in memory resource 106 to generate a small vector image that includes the analog imagery of the image. In some examples, the small vector image can include the analog imagery and not include the background of the image. For example, the background of the image can be separated from the analog imagery and removed prior to generating the small vector image. In some examples, the background of the image can be made transparent. As used herein, a transparent background allows objects behind the background to be viewed without obstruction. For example, a small vector image can include a filled in circle with a transparent background. In this example, the small vector image can be placed on a graphical image that is displayed on a display of the computing device 102. In this example, the filled in circle can cover up a portion of the graphical image and the transparent background can show the graphical image "behind" the background.

In some examples, the generated small vector image can be stored by a small vector image application or signature application. For example, the captured image can be a signature that was written on paper. In this example, the generated small vector image can include signature (e.g., analog imagery) with a transparent background. The small vector image in this example can be stored in a signature application and retrieved when the signature application is opened with a graphical image. In this example, the small vector image of the signature can be positioned on a signature line of an image of a document (e.g., contract, etc.).

In some examples, the computing device 102 can identify a first color that corresponds to a first portion of the analog imagery and a second color that corresponds to a second portion of the analog imagery. For example, the analog imagery of the image can include a first portion that is a first color and a second portion that is a second color. In some examples, the computing device 102 can identify that a plurality of colors exist within the image and determine a corresponding color for each of the plurality of colors. For example, the computing device can identify that a first portion of the image is a first color that is blue and a second portion of the image is a second color that is magenta. In this example, the computing device 102 can determine a corresponding color for the first color to be black and a corresponding color for the second color to be red. In this example, the generated small vector image can be generated such that the first portion of the image is black and the second portion of the image is red.

In some examples, the computing device 102 can determine and/or select a color for the background of the image. As described herein, the background of the image can be transparent. However, in some examples, the background can be a particular color. In some examples, the particular color of the background can be determined and/or selected based on the corresponding colors utilized when generating the small vector image. For example, when relatively lighter colors are utilized as corresponding colors, a relatively darker color can be selected for the background color. In another example, when relatively darker colors are utilized as corresponding colors, a relatively lighter or transparent background can be selected.

In some examples, the computing device 102 can determine a pixel tolerance level for the small vector image that identifies a variation of color values between the analog imagery and the background. As used herein, a pixel tolerance level can be a threshold quantity of dead pixels between the analog imagery and the background of the image. As used herein, dead pixels are pixels that are not representative of the correct color or detail. For example, the pixel tolerance level can be adjusted so that relatively lighter marks and relatively darker marks of the same image can each be accepted or represented as analog imagery instead of the background.

In some examples, the computing device 102 can capture a plurality of images and generate a plurality of small vector images. In some examples, the plurality of small vector images can be layered on top of each other to generate a single small vector image that includes the plurality of small vector images. In some examples, each of the plurality of small vector images can be a different color and when layered with other small vector images can generate a small vector images that includes a plurality of colors. This process is described further in reference to FIG. 3.

As described herein, the computing device 102 can utilize a camera to capture images of a substrate that includes analog imagery and generate small vector images of the analog imagery and/or background. This can allow the computing device 102 to generate custom small vector images that can be stored and/or utilized by other applications on the computing device 102.

Figure 2:
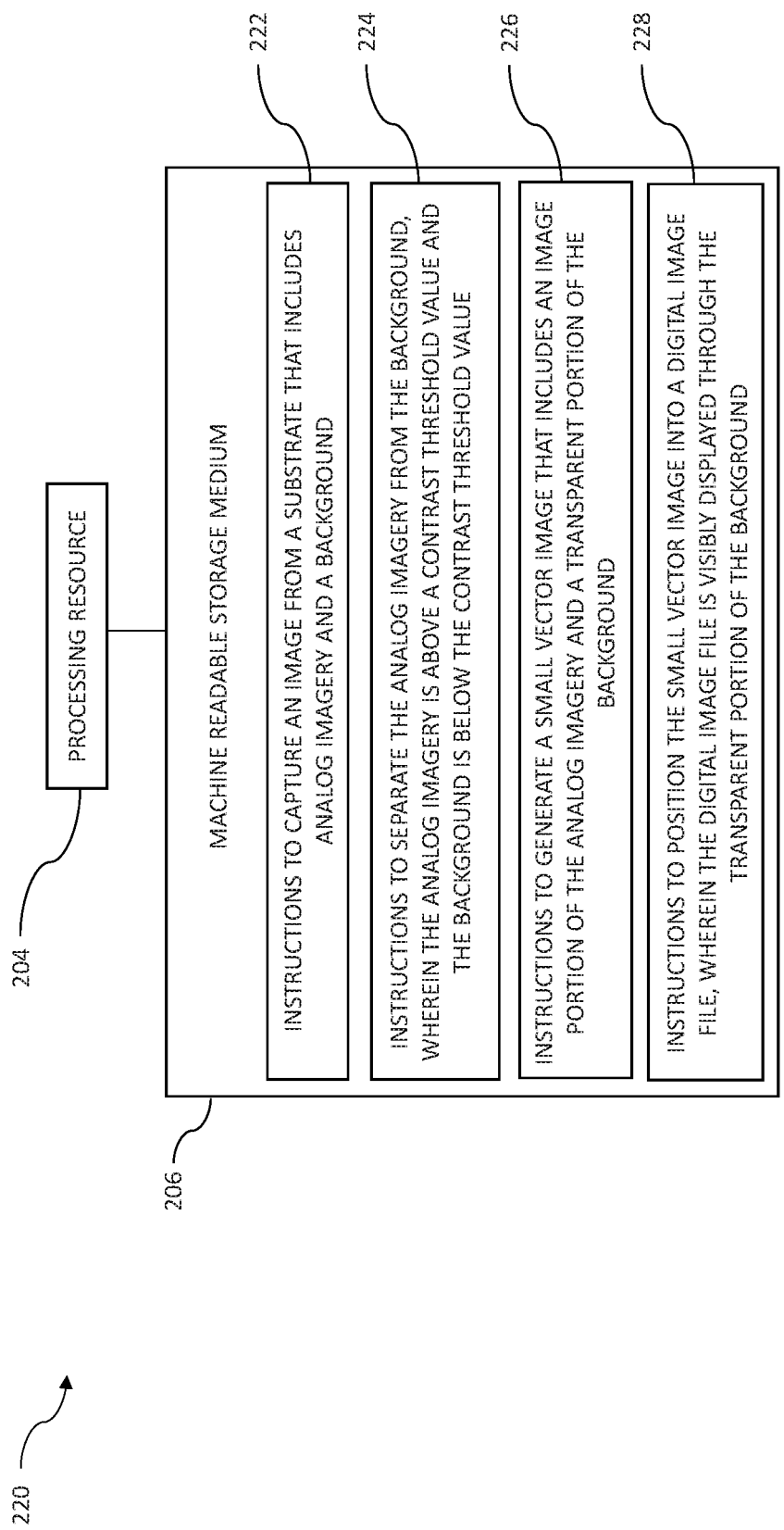
FIG. 2 illustrates a block diagram of an example of a system suitable for small vector image generation consistent with the disclosure.

FIG. 2 illustrates a block diagram of an example of a system 220 suitable for small vector image generation consistent with the disclosure. The system 220 can include a processing resource 204 and a memory resource 206. Memory resource 206 can include machine readable instructions such as capture instructions 222, separate instructions 224, generate a small vector image instructions 226, and/or position instructions 228.

Processing resource 204 may be a central processing unit (CPU), a semiconductor based microprocessor, and/or other hardware devices suitable for retrieval and execution of machine-readable instructions 222, 224, 226, 228 stored in a memory resource 206, Processing resource 204 may fetch, decode, and execute instructions 222, 224, 226, 228. As an alternative or in addition to retrieving and executing instructions 222, 224, 226, 228 processing resource 204 may include a plurality of electronic circuits that include electronic components for performing the functionality of instructions 222, 224, 226, 228.

Memory resource 206 may be any electronic, magnetic, optical, or other physical storage device that stores executable instructions 222, 224, 226, 228 and/or data, Thus, memory resource 206 may be, for example, Random Access Memory (RAM), an Electrically-Erasable Programmable Read-Only Memory (EEPROM), a storage drive, an optical disc, and the like. Memory resource 206 may be disposed within a device. Additionally, and/or alternatively, memory resource 206 may be a portable, external or remote storage medium, for example, that allows the system 220 to download the instructions 222, 224, 226, 228 the portable/external/remote storage medium.

Processing resource 204 may execute capture instructions 222 stored in memory resource 206 to capture an image from a substrate that includes analog imagery and a background. In some examples, the system 220 can include a digital camera or other image capturing device to capture an image that is on a substrate. For example, capturing the image can include taking a picture of a drawing or text drawn on paper. In this example, the digital camera can include marks (e.g., analog imagery, image, shapes, text, etc.) on a substrate and a background that surrounds the marks.

Processing resource 204 may execute separate instructions 224 stored in memory resource 206 to separate the analog imagery from the background, wherein the analog imagery is above a contrast threshold value and the background is below the contrast threshold level. As described herein, the analog imagery of the image can be separated from the background of the image. In some examples, the contrast threshold value can be utilized to determine the analog imagery portion of the image and determine the background portion of the image. In some examples, the analog imagery portion and the background portion of the image can be separated and utilized to generate the small vector image as described herein.

Processing resource 204 may execute generate a small vector image instructions 226 stored in memory resource 206 to generate a small vector image that includes an image portion of the analog imagery and a transparent portion of the background. As described herein, a small vector image can be generated by removing the background from the analog imagery such that the analog imagery is a first color and the background is a second color. For example, the analog imagery can be displayed as black in the small vector image and the background can be transparent such that images can be viewed behind the background portion.

Processing resource 204 may execute position instructions 228 stored in memory resource 206 to position the small vector image into a digital image file, wherein the digital image file is visibly displayed through the transparent portion of the background. As described herein, a generated small vector image can be utilized by an application for editing or modifying digital image files. For example, the generated small vector image can be imported or positioned on top of a digital image file. In this example, the analog imagery can block a portion of the digital image file and the background can allow the digital image to be viewed behind the background.

In some examples, the system 220 can display the analog imagery and the background on a display and receive a positioning input to alter a position of the analog imagery on the display. For example, the small vector image can be positioned over a digital image file displayed on the display. In this example, a received input from a user or other device can alter a position of the small vector image via a positioning input. As used herein, a positioning input can include an input to instruct the system to alter a position of the generated small vector image.

In some examples, the system 220 can inverse a color of the analog imagery and the background of the generated small vector image. For example, a first color of the image portion and a second color of the transparent portion can be invisible to replace the image portion of the analog imagery to the second color and the transparent portion of the background to the first color. In another example, the analog imagery portion of the generated small vector image can be black and the background can be transparent. In this example, the system 220 can receive instructions or an input to inverse the colors. In this example, the system 220 can generate an additional small vector image where the analog imagery portion is transparent and the background portion is black.

Figure 3:
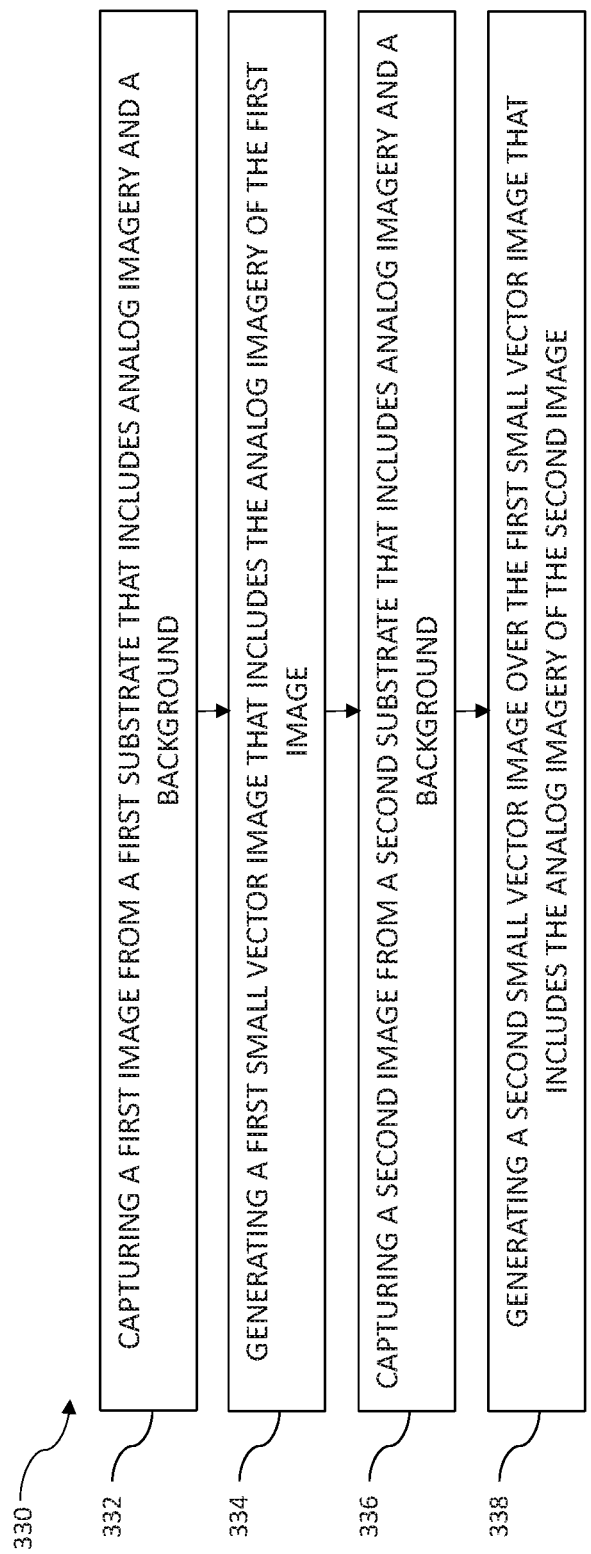
FIG. 3 illustrates an example of a method for small vector image generation consistent with the disclosure.

FIG. 3 illustrates an example of a method 330 for small vector image generation consistent with the disclosure. In some examples, the method 330 can be executed by a computing device (e.g., computing device 102 as referenced in FIG. 1, system 220 as referenced in FIG. 2, etc.). The method 330 can be utilized to generate small vector images as described herein.

At 332 the method 330 can include capturing a first image from a first substrate that includes analog imagery and a background. As described herein, a camera can be utilized to capture the first image. In some examples, the first image can be a first type of image or analog imagery. In some examples, the first image can be a portion of a complete image. For example, the first image can be a first portion of the analog imagery that is a first color. In this example, the complete image can be an image that includes a plurality of colors including the first color.

At 334 the method 330 can include generating a first small vector image that includes the analog imagery of the first image. As described herein, the first small vector image can be generated by separating the analog imagery from the background and generating a small vector image of the analog imagery. In some examples, the first small vector image can be displayed in a user interface on a display of a mobile device or computing device.

At 336 the method 330 can include capturing a second image from a second substrate that includes analog imagery and a background. In some examples, the second image from the second substrate can be captured by a camera in a similar manner as the first image. In some examples, the second image can be a second type of image or analog imagery. In some examples, the second image can be a portion of the complete image. For example, the second image can be a second portion of the analog imagery that is a second color.

At 338 the method 330 can include generating a second small vector image over the first small vector image that includes the analog imagery of the second image. In some examples, the second small vector image can be generated by separating the analog imagery from the background of the second image. In some examples, the generated second small vector image can be displayed in the user interface on the display of the mobile device or computing device. In some examples, the second small vector image can be positioned within the same user interface on the display as the first small vector image. In some examples, the first small vector image and the second small vector image can be positioned within the user interface at a particular position. In some examples, the method 330 can include generating a third small vector image that includes the first small vector image and the second small vector image at a defined position within the user interface.

In some examples, the method 330 can be utilized to generate a small vector image with a plurality of colors. For example, a first vector image that includes a first color and a second vector image that includes a second color can be combined to generate a small vector image that includes the first color and the second color. In some examples, the method 330 can include altering a position of the second small vector image within a border of the first small vector image. For example, the border of the user interface can be a border of the first small vector image and a position of the second small vector image can be altered within the user interface and/or the border of the first small vector.

Figure 4:
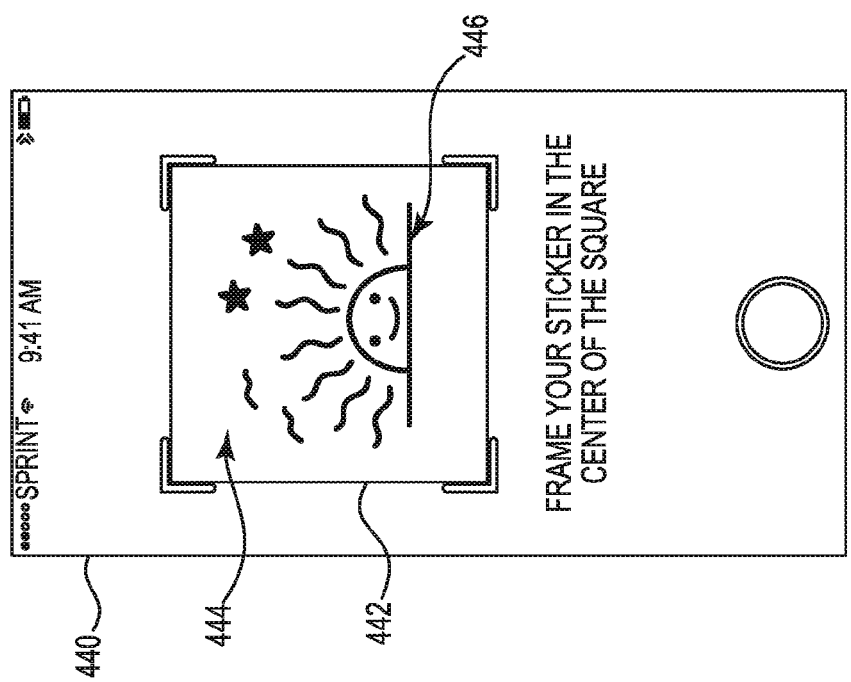
FIG. 4 illustrates a display of a computing device suitable for small vector image generation.

FIG. 4 illustrates a display 440 of a computing device suitable for small vector image generation. In some examples, the display 440 can be coupled to a computing device (e.g., computing device 102 as referenced in FIG. 1, system 220 as referenced in FIG. 2, mobile computing device, mobile device, etc.). In some examples, the display 440 can display an image 442.

In some examples, the image 442 can be an image captured by a camera as described herein. For example, a mobile device with an integrated camera can take a picture of a piece of paper with an image to generate the image 442. In some examples, the image 442 can be a picture of a drawing on a piece of paper.

The image 442 can include analog imagery 446 and a background 444. In some examples, the analog imagery 446 can be a portion of the image 442 that includes marks (e.g., images, shapes, drawings, text, etc.). In some examples, the background 444 can be a portion of the image 442 that does not include marks. For example, the background 444 can be blank paper that does include drawing marks.

As described herein, a computing device or system coupled to the display 440 can be utilize to separate the analog imagery 446 from the background 444 of the image 442. As described herein, a contrast threshold value can be utilized to separate the analog imagery 446 from the background 444. For example, the analog imagery 446 can be above a contrast threshold value and the background 444 can be below the contrast threshold value. As described further herein in reference to FIG. 5, the separated analog imagery 446 and background 444 can be utilized to generate a small vector image to be displayed on the display 440.

Figure 5:
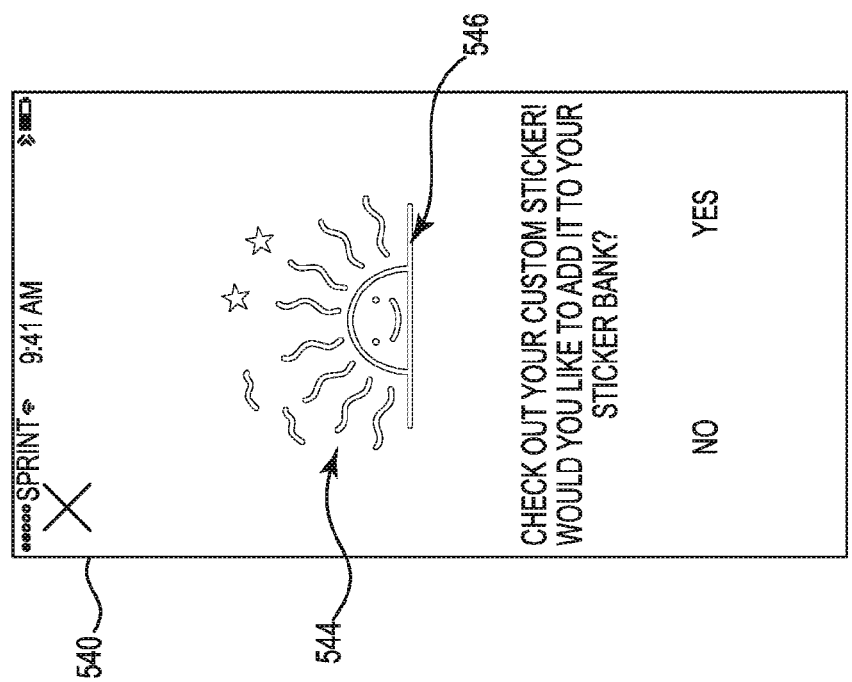
FIG. 5 illustrates a display of a computing device suitable for small vector image generation.

FIG. 5 illustrates a display 540 of a computing device suitable for small vector image generation. In some examples, the display 540 can include a small vector image that is generated based on the analog imagery 446 as referenced in FIG. 4 and/or the background 444 as referenced in FIG. 4.

As described herein, the analog imagery 546 can be a first color (e.g., black, etc.) and the background 544 can be a second color (e.g., transparent, etc.). In some examples, the background 544 can be transparent such that an image behind the background 544 can be visible behind the background 544. In some examples, the generated small vector image can be stored by an application for editing digital image files and/or digital documents. For example, the generated small vector image displayed on the display 540 can be positioned on a picture displayed on the display 540. In this example, the analog imagery 546 can cover the picture displayed on the display 540 and the background 544 can be transparent such that the picture is visible behind the background 544.

As used herein, "logic" is an alternative or additional processing resource to perform a particular action and/or element described herein. Logic can include hardware. The hardware can include processing resources such as circuitry, which are distinct from machine-readable instructions on a machine readable media. Further, as used herein, "a" can refer to one such thing or more than one such thing.

The above specification, examples and data provide a description of the method and applications, and use of the system and method of the disclosure. Since many examples can be made without departing from the spirit and scope of the system and method of the disclosure, this specification merely sets forth some of the many possible example configurations and implementations.

What is claimed is:

1. A computing device, comprising:
a processing resource; and
a memory resource storing machine readable instructions to cause the processing resource to:
capture an image of a substrate;
define a marked area of the image of the substrate as analog imagery, wherein the analog imagery includes markings that are drawn on the substrate;
separate the analog imagery of the image from a background of the image; and
generate a small vector image that includes the analog imagery of the image; and
display the small vector image over a graphical image such that the graphical image is viewable through a background of the small vector image, wherein the small vector image comprises a plurality of geometric objects to form the analog imagery.

2. The computing device of claim 1, wherein the processing resource executes machine readable instructions to cause the processing resource to generate the small vector image that includes a transparent portion for the background of the image.

3. The computing device of claim 1, wherein the processing resource executes machine readable instructions to utilize a contrast threshold to separate the analog imagery from the background of the image, wherein the background of the image is below the contrast threshold and the analog imagery is above the contrast threshold.

4. The computing device of claim 1, wherein the processing resource executes machine readable instructions to cause the processing resource to convert the analog imagery to a single color and remove the background from the image.

5. The computing device of claim 1, wherein the processing resource executes machine readable instructions to cause the processing resource to:
identify a first color that corresponds to a first portion of the analog imagery and a second color that corresponds to a second portion of the analog imagery;
select a third color for the background of the image; and
generate the small vector image to include the first portion of the analog imagery in the first color, the second portion of the analog imagery in the second color, and the background of the image in the third color.

6. The computing device of claim 1, wherein the processing resource executes machine readable instructions to cause the processing resource to determine a pixel tolerance level for the small vector image that identifies a variation of color values between the analog imagery and the background.

7. A non-transitory machine readable storage medium having stored thereon machine readable instructions to cause a processing resource to:
capture an image from a substrate that includes analog imagery on a background of the substrate, wherein the analog imagery includes markings that are drawn on the substrate and the background includes the substrate surrounding the analog imagery;
separate the analog imagery from the background of the image, wherein the analog imagery is above a contrast threshold value and the background is below the contrast threshold value;
generate a small vector image that includes an image portion of the analog imagery and a transparent portion of the background, wherein the small vector image comprises a plurality of geometric objects to form the analog imagery;

position the small vector image into a digital image file, wherein the digital image file is visibly displayed through the transparent portion of the background; and display the small vector image over a graphical image of the digital image file such that the graphical image is viewable through the background of the small vector image.

8. The medium of claim 7, comprising instructions to cause the processing resource to display the analog imagery and the background on a display and receive a positioning input to alter a position of the analog imagery on the display.

9. The medium of claim 8, wherein a first color of the image portion and a second color of the transparent portion are invisible to replace the image portion of the analog imagery to the second color and the transparent portion of the background to the first color.

10. A method, comprising:

capturing a first image from a first substrate that includes analog imagery on the first substrate and a background of the first substrate surrounding the analog imagery on the first substrate, wherein the analog imagery includes markings that are drawn on the first substrate;

generating a first small vector image that includes the analog imagery of the first image, wherein the first small vector image comprises a plurality of geometric objects to form the analog imagery drawn on the first substrate;

capturing a second image from a second substrate that includes analog imagery on the second substrate and a background of the second substrate surrounding the analog imagery of the second substrate, wherein the analog imagery includes markings that are drawn on the second substrate;

generating a second small vector image over the first small vector image that includes the analog imagery of the second image; and displaying the second small vector image over a graphical image such that the graphical image is viewable through a background of the second small vector image, wherein the second small vector image comprises a plurality of geometric objects to form the analog imagery drawn on the second substrate.

11. The method of claim 10, wherein the first small vector image is generated in a first color and the second small vector image is generated in a second color.

12. The method of claim 11, wherein the first image is a first portion of a complete image and the second image is a second portion of the complete image.

13. The method of claim 10, wherein the method includes altering a position of the second small vector image within a border of the first small vector image.

14. The method of claim 13, wherein the first image comprises a first color and the first small vector image comprises a second color that is different than the first color.

* * * * *